April 18, 1933. M. ZAIGER ET AL 1,904,342
SPLASH FLAP FOR AUTOMOBILES
Filed Feb. 18, 1931
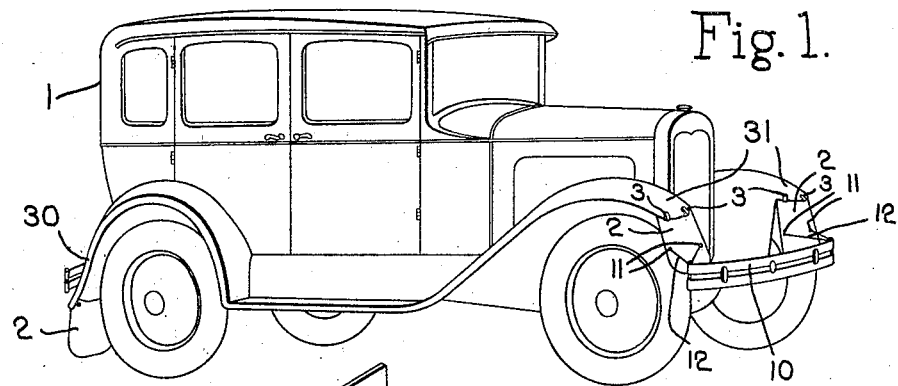
Fig.1.
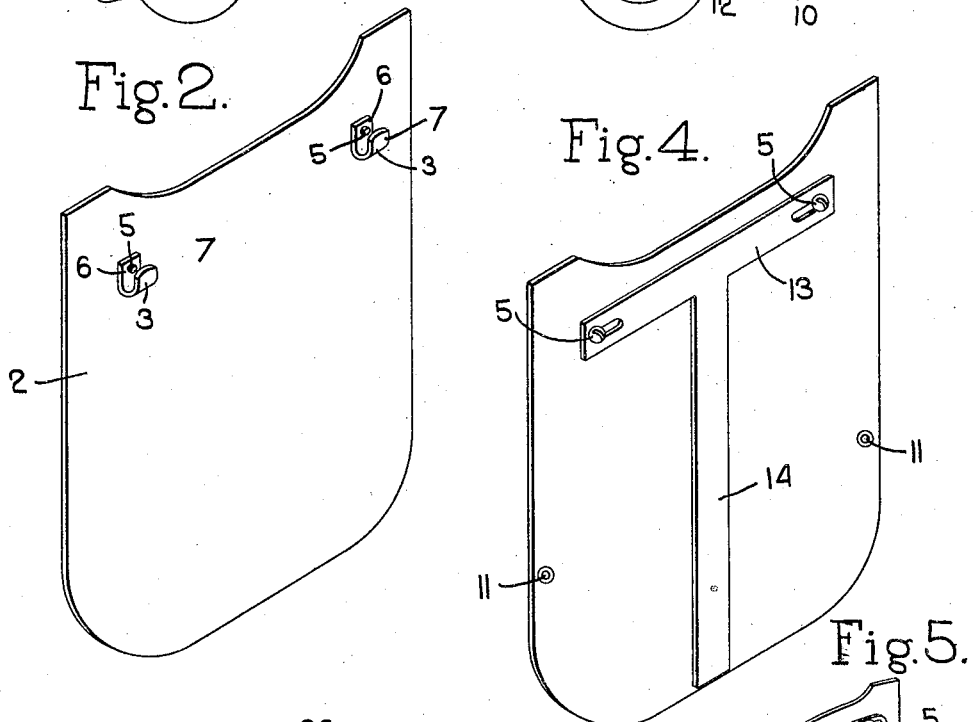
Fig.2.
Fig.4.
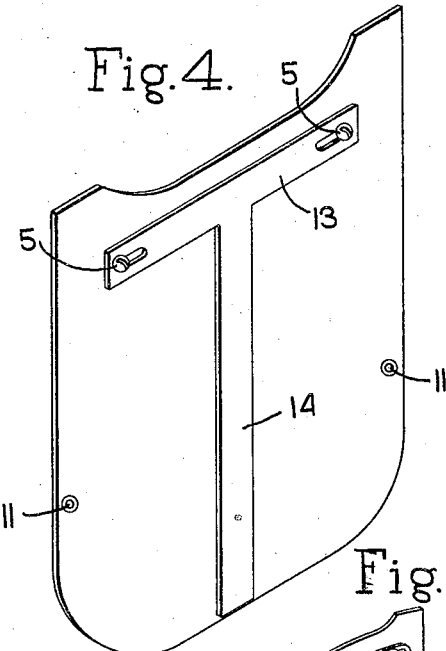
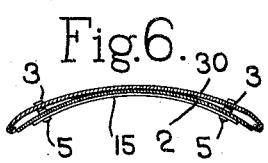
Fig.3.
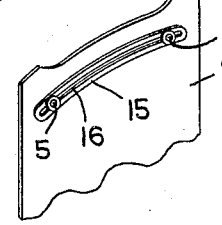
Fig.6.
Fig.5.
Inventors.
Max Zaiger
Louis Zaiger
by Heard Smith & Tennant.
Attys.

Patented Apr. 18, 1933

1,904,342

UNITED STATES PATENT OFFICE

MAX ZAIGER, OF SWAMPSCOTT, AND LOUIS ZAIGER, OF LYNN, MASSACHUSETTS

SPLASH FLAP FOR AUTOMOBILES

Application filed February 18, 1931. Serial No. 516,601.

This invention relates to splash flaps designed to be attached to the fenders of automobiles to prevent the mud which is picked up by the wheels from being thrown onto the bumpers and other parts of the automobile body.

One object of the invention is to provide a splash flap which has a simple and inexpensive means for attaching it to the fender, which means, however, furnishes a firm attachment which will not work loose as the automobile is used.

Another object of the invention is to provide a splash flap which is specially designed for attachment to the front end of the front fender to prevent the mud, dirt, etc. from being thrown onto the front bumper.

Other objects of the invention are to improve generally splash flaps in the particulars hereinafter set forth.

In order to give an understanding of the invention we have illustrated in the drawing a selected embodiment thereof which will now be described after which the novel features will be pointed out in the appended claims.

In the drawing:

Fig. 1 is a view of an automobile having splash flaps embodying the invention applied to both the front and rear fenders;

Fig. 2 is a perspective view of one of the splash flaps;

Fig. 3 is an enlarged sectional view showing the manner in which the flap is secured to the fender;

Fig. 4 is a perspective view of a splash flap embodying the invention which may be used for the front fender;

Fig. 5 is a fragmentary perspective view on a reduced scale showing the opposite side of the splash flap from that shown in Fig. 2;

Fig. 6 is a reduced section on the line 6—6, Fig. 3.

Our improved splash flap can be attached either to the rear fender or to the front fender and in Fig. 1 we have shown it as attached to both the rear fender and the front fender.

Referring first to Fig. 1, 1 indicates an automobile having the usual rear fender 30 and front fender 31 and 2 is the splash flap which is secured thereto. This flap may be made of any suitable material, either rubber or rubber coated fabric or any other material which will answer the purpose.

One of the novel features of the invention relates to the manner in which the flap 2 is secured to the fender. For this purpose two clips or attaching devices 3 are provided, each of which has a general U shape and is adapted to embrace the edge 4 of the fender. Each clip is fastened to the flap 2 and also clamped to the fender through the medium of a clamping screw 5. These screws 5 pass through the flap from the inside outwardly and screw into the inner leg 6 of the U-shaped clip 3. When the clip is applied to the edge of the fender with the outer leg 7 outside of the fender and the screw 5 is tightened said screw will engage the inner face of the fender just beyond the bead 8 with which fenders are usually provided at the edge. When the screw is set up tightly the clip will be firmly clamped to the fender. The flap 2 is thus hung from the two screws 5 by which the clips 3 are secured to the fender and these screws, therefore, serve the double purpose of forming a means for attaching the flap to the clips and also for attaching the clips to the fender.

If desired, the splash flaps 2 may be thickened somewhat at the point where the screws 5 pass therethrough thus providing a reinforcement for the flaps at this point. We may also employ washers 9 between the heads of the screws 5 and the inner face of the flap which help reinforce the flap at this point and prevent the heads of the screws from pulling through the flap.

This form of flap-attaching means is inexpensive to manufacture; is easily applied to the fender, and makes a firm connection between the flap and the fender.

Where the flap is secured to the rear end of the rear fender as shown in Fig. 3, the clips 3 provide all the attaching means which is necessary. Where the flap is to be attached to the edge of the front fender, however, it is desirable to employ some additional means to hold the flap out of contact with the front wheel as when the automobile is in motion the wind pressure against the flap would tend to swing it backwardly into contact with the front wheel.

Various ways of attaining this end may be provided. In Fig. 1 we have shown the flap as being not only secured to the front end of the front fender as above described but also have illustrated means for securing the flap to the front bumper 10. For this purpose the flap is shown as provided with apertures or eyelets 11 through which pass cords or flexible connections 12 by which the flap may be tied to the bumper.

In Fig. 4 another means is shown for holding the flap out of contact with the front wheel. In this construction there is provided a resilient metal strip 13 which extends transversely across the flap on the inside thereof and through which the clamping screws 5 extend. This metal strip is thus clamped against the inside of the flap at its upper end and when the screws are tightened the tendency will be to bow the metal strip slightly so as to force the flap against the under side of the front fender and in contact therewith.

This metal strip has rigid therewith an arm 14 which extends downwardly toward the free end of the flap and against which the flap is supported. This arm 14 and strip 13 serve to keep the flap out of contact with the front wheel.

We may also, if desired, employ a metal strip 15 in connection with the splash flap shown in Fig. 2 and which is designed for attachment to the rear fenders for the purpose of assisting in holding the flap closely against the concave inner face of the rear fender 30. The strip 15 is shown as slightly curved and preferably somewhat resilient. It is provided with a slot or slots 16 through which the clamping screws 5 extend. When these grooves are tightened for clamping the flap to the fender 30 the curved resilient strip 15 will bear against the inner face of the flap 2 and because of the curved shape of the strip 15 this flap 2 will be pressed against the inner concavely-curved face of the fender 30 as shown in Fig. 6. In this respect the strip 15 accomplishes substantially the same function as the strip 13 in Fig. 4 so far as holding the flap against the inside face of the fender is concerned.

We claim:

1. A splash flap construction for the front fenders of automobiles comprising a flap member, means for securing said flap member to the front edge of the front fender, and a downwardly-extended arm in the rear of the flap to hold the flap separated from the front wheel when the automobile is in motion.

2. A splash flap construction for the fenders of automobiles comprising a flap member, two one-piece U-shaped clips having substantially parallel legs and adapted to embrace the rear edge of an automobile fender, the outer face of the inner leg of each clip engaging the outer face of the flap member, a headed clamping screw for each clip, each clamping screw extending through the flap member and through the inner leg of the corresponding clip and having screw-threaded engagement with said leg and having such a length that when the screw is tightened it serves to clamp the flap member to the clip and the clip to the rear edge of the fender.

3. A splash flap construction for the fenders of automobiles comprising a flap member, two one-piece U-shaped clips having substantially parallel legs and adapted to embrace the rear edge of an automobile fender, the outer face of the inner leg of each clip engaging the outer face of the flap member, a headed clamping screw for each clip, each clamping screw extending through the flap member and through the inner leg of the corresponding clip and having screw-threaded engagement with said leg, the length of each screw having such relation to the spacing of the legs of the clip that when the screw is tightened to clamp the flap member between the head of the screw and the clip the end of the screw engages the underface of the fender and clamps the latter against the inner face of the outer leg.

4. A splash flap construction for the fenders of automobiles comprising a splash flap member, two one-piece U-shaped clips adapted to embrace the rear edge of the automobile fender, the outer face of the inner leg of each clip engaging the outer face of the flap member near the top, a resilient curved metal strip overlying the inner face of said flap member near the top, a headed clamping screw for each clip, each clamping screw extending through the metal strip, flap member and the inner leg of the corresponding clip and being screw threaded to said inner leg, each screw having such a length relative to the spacing of the legs of the clip that when the screw is tightened to clamp the strip and flap member against the inner leg of the clip the end of the screw will be engaging the inner face of the fender and clamping the latter against the inside face of the outer leg of said clip.

In testimony whereof, we have signed our names to this specification.

MAX ZAIGER.
LOUIS ZAIGER.